United States Patent

[11] 3,622,244

| [72] | Inventor | Anwar K. Chitayat<br>Plainview, N.Y. |
|---|---|---|
| [21] | Appl. No. | 6,711 |
| [22] | Filed | Jan. 29, 1970 |
| [45] | Patented | Nov. 23, 1971 |
| [73] | Assignee | OPTOmechanisms, Inc.<br>Plainview, N.Y.<br>Continuation of application Ser. No.<br>620,520, Mar. 3, 1967, which is a continuation-in-part of application Ser. No. 507,919,<br>Mar. 25, 1969, now Patent No. 3,434,787. |

[54] DUAL AXES INTERFEROMETER
4 Claims, 10 Drawing Figs.

| [52] | U.S. Cl. | 356/106 |
|---|---|---|
| [51] | Int. Cl. | G01b 9/02 |
| [50] | Field of Search | 356/106–113 |

[56] References Cited
UNITED STATES PATENTS
3,409,375  11/1968  Hubbard ............ 356/106

OTHER REFERENCES

" Three Interferometry Systems for Precision Measurement." An article in the Magazine Laser Focus, Vol. 2 No. 1, Jan. 1, 1966, pp. 12– 20.

London, Fred H., " Laser Interferometer." An article in Magazine Instrument and Control Systems, Vol. 37, No. 11, Nov. 1964, pp. 87– 89.

*Primary Examiner*—Ronald L. Wibert
*Assistant Examiner*—T. Major
*Attorney*—James P. Malone ABSTRACT: An interferometer device for measuring motion of an instrument along two axes. The instrument such as a microscope or quill is mounted on X- and Y-axes carriages. The heavy laser light source and detectors are mounted on the base of the machine and an interferometer optical block is mounted on one of the carriages. The optical block is quite small and light in weight and does not emit any heat so that it does not cause any mechanical distortion of the carriages.

PATENTED NOV 23 1971 3,622,244

INVENTOR.
ANWAR CHITAYAT
BY James K. Malone

INVENTOR.
ANWAR CHITAYAT
BY James P. Malone

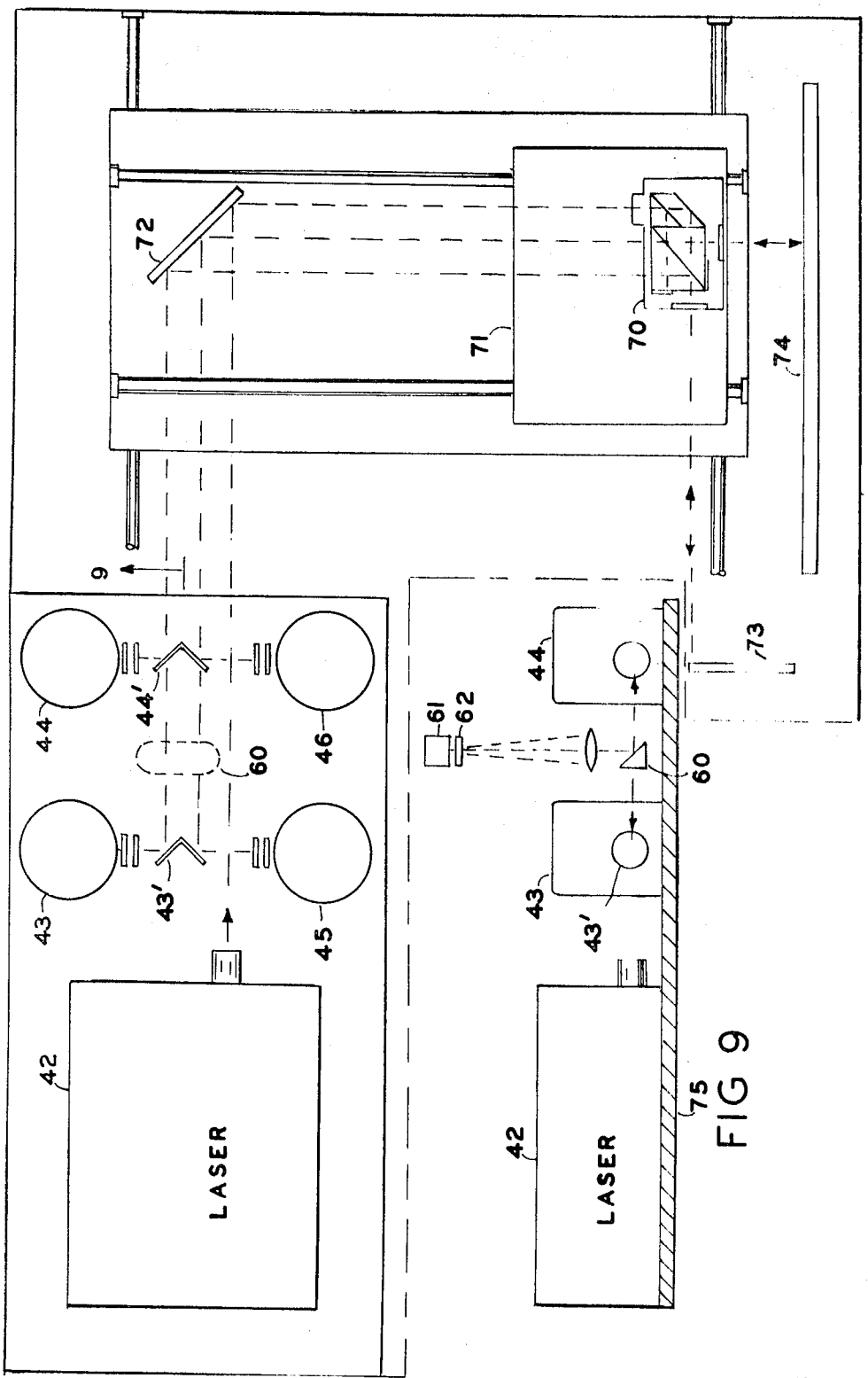

DUAL AXES INTERFEROMETER

This application is a continuation of my prior application of the same name, Ser. No. 620,520, filed Mar. 3, 1967. That application was a continuation-in-part of my prior application Ser. No. 507,919, now U.S. Pat. No. 3,434,787, granted Mar. 25, 1969 for DOUBLE-AXES INTERFEROMETER.

This invention relates to a double axes interferometer means for measuring movement of an instrument along coordinate axes.

In my prior application the entire interferometer including a laser light source and detector means was mounted on one of the moving carriages.

In the present application the heavy components including the laser are mounted on the base of the machine and only a lightweight interferometer optical block is mounted on one of the carriages. Since the optical block is very light, small in size, and does not generate any heat there is no likelihood of mechanical distortion of the carriages or their movement due to the weight or heat emitted by the laser generator.

The following factors must be considered.

1. The weight of the light source, such as a laser, and photodetectors is very heavy. Consequently, their placement on a carriage may produce distortion which may reduce or change the inherent accuracy of the machine.
2. The heat generated by the detectors, their associated amplifier may produce distortion in the machine.
3. The heat generated by the light source may also produce distortions, and may change the temperature of the part or machine, while measurements are being made.
4. In some applications, the laser light source may be too sensitive to vibrations which might be encountered by the location of the interferometer on a moving member.

Consequently, it is desirable to design a lightweight interferometer which is located remotely from the light source and detectors. By separating the laser, it is now possible to locate it in a remote location.

Accordingly, a principal object of the invention is to provide new and improved interferometer means.

Another object of the invention is to provide new and improved interferometer optical block means.

Another object of the invention is to provide new and improved dual axes interferometer means.

Another object of the invention is to provide new and improved interferometer means for measuring movement of an instrument along coordinate axes.

Another object of the invention is to provide new and improved interferometer means for measuring movement of an instrument along coordinate axes wherein the heavy laser light source and detection equipment are mounted on the base of the machine and a small size, lightweight optical block is mounted on one of the carriages.

Another object of the invention is to provide new and improved dual axes interferometer means for measuring movement of an instrument along two coordinate axes in a machine of the type having X- and Y-coordinate axes carriages movably mounted on a base comprising, a light source and detector means fixedly mounted on the base of said machine, optical block means mounted on one of said carriages said optical block means comprising means to receive a light beam from said light source, means to split said light beam into X- and Y-components, means to receive reflections of said X- and Y-components from X- and Y-reflectors the phases of said X- and Y-reflections being proportional to the X- and Y-distances of said instrument from a reference point, interferometer means in said optical block to produce X- and Y-fringes and means to transmit said fringes to said detector means.

FIG. 1 is a schematic diagram illustrating a system such as shown in my prior application.

FIGS. 2, 3, and 4 are schematic diagrams of embodiments of the present invention.

FIG. 8 is a schematic diagram of another embodiment of the invention capable of determining direction.

FIG. 9 is a sectional view of a portion of FIG. 8 taken along the line 9—9 of FIG. 8 and illustrating the alignment telescope.

Single-Axis Interferometers are extremely useful in checking single axis machines and dual or triple axes, one at a time. However, these interferometers are inadequate for checking the coordinate measuring capability of a two or three axes machine, if there is a dependence of one axis on the others. Cumbersome methods have been used to determine interaction of axes:

1. A two axes machine may be checked by using a single-axis interferometer and two collimators. The interferometer checks the measuring system of one axis while the auto collimator may determine the pitch, yaw, and roll errors of the motion of the ways. Orthogonality of the axes may then be checked independently, using a calibrated pentaprism or other means.
2. Another possible method is to use two interferometers, as shown in FIG. 1.

Figure 1:
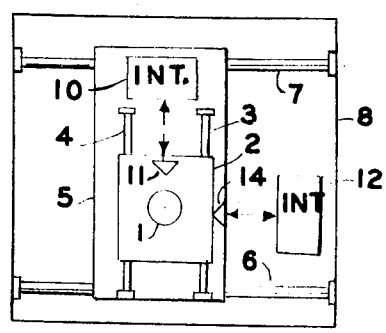

FIG. 1 shows an arrangement such as shown in my prior application. An instrument 1, for instance a microscope or quill, is mounted for movement along the X-axis and the Y-axis. The instrument 1 is mounted on the Y-carriage 2 which is mounted for movement along the Y-axis by means of guide rods or rails 3 and 4 which are mounted on the X-carriage 5. The X-carriage 5 is mounted for movement along the X-axis by rails 6 and 7 which are mounted on the base 8.

The Y-movement is measured by means of the interferometer 10 which is mounted on the X-carriage and which sends a beam to and receives reflections from the mirror or corner cube 11 which is mounted on the Y-carriage. The X-motion is measured by the interferometer 12 which is mounted on the base 8 and which sends a beam to and receives reflections from the mirror or corner cube 14 on the X-carriage.

The method described above has the disadvantage that there is usually a large displacement between the two reflectors. In addition, the two interferometers are measuring two axes which may not be orthogonal, since they may displace relative to each other due to the motion of the ways. Consequently, the above method is susceptible to inaccuracies caused by the inaccuracy of the ways. If the ways are perfectly square and orthogonal, then the calibrating system is adequate. The above method may also be used with autocollimators which measure the angular deviation of the ways and introduce a correction to compensate for these errors. This correction increases the time of calibration, due to the extensive computation involved.

Analyses were made on a mirror-type interferometer where two orthogonal mirrors are located on a machine and a two-axes interferometer measures the displacement from these two orthogonal surfaces. These analyses indicated accuracies independent of way motion as long as the optical center of the interferometer is located close to the microscope in a measuring machine, or close to the tool in a machine tool. Two systems were considered, one utilizing two large mirrors on the quill of the machine and the other using the long mirrors on the X-Y of the base axes of the machine tool. In a practical situation, it is believed that the long mirrors may be difficult to attach to the quill, or to a microscope mount, due to their huge size or weight; consequently, it is realized that the most practical and accurate approach is to utilize a two-axes interferometer on the quill (or microscope) and the two mirrors on the base of the machine. This approach is only practical if the size and weight of the interferometer is reasonable, that is one-half to 5 pounds, in order to allow easy mounting on the quill or microscope.

Figure 2:
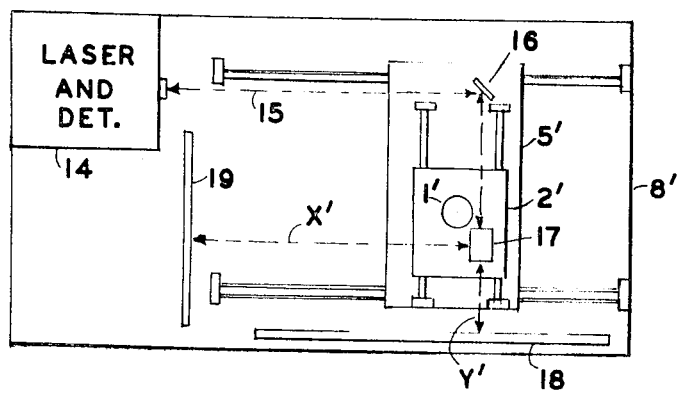

FIG. 2 shows an embodiment where only the optics are located on the microscope, while the laser light source and detectors are located in a remote location.

FIG. 2 shows a schematic diagram of the embodiment of the invention having a base 8'. An X-carriage 5' is mounted for movement along the X-axis in the same manner as in FIG. 1. The Y-carriage 2' is mounted for movement along the Y-axis the same as described in connection with FIG. 1. The instrument 1' is mounted on the Y-carriage. The laser generator and detector equipment 14 is not mounted on either carriage but is fixedly mounted on the base 8'. The laser generator sends a beam 15 which is reflected by the 45° mirror 16 which is mounted on the X-carriage into an optical interferometer block 17 which is mounted on Y-carriage. Y-carriage As will be described in detail, the optical block splits the energy beam into X- and Y-components and splits the X- and Y-components into reference and variable length components and produces interference fringes or patterns which are counted. The X-measuring beam X' is transmitted to reflect from a long mirror 19 which is mounted on the base 8' parallel to the Y-axis. The Y-measuring beam Y' is transmitted to and reflected from a long mirror 18 which is mounted on the base 8' parallel to the X-axes.

As will be explained in connection with FIG. 5, the optical block 17 contains beam splitters and reflectors adapted to provide the necessary beam components and create the fringes which are detected in order to make the measurement.

Figure 3:
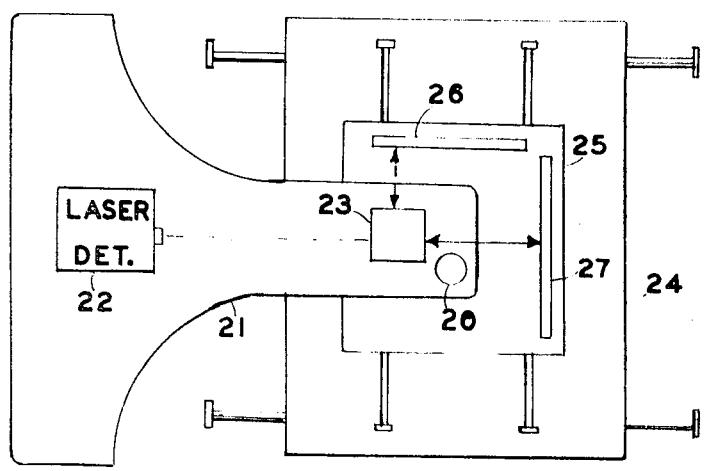
Figure 4:
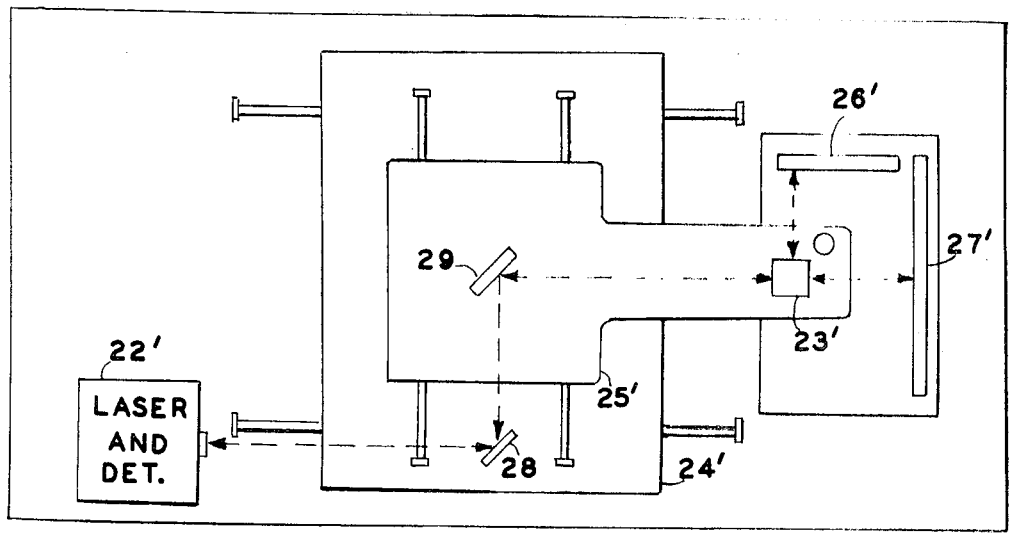

FIG. 3 illustrates a system to calibrate such machines as jig bores. FIG. 4 illustrates a measuring system where the microscope moves on a small carriage above a light table (such as a film viewer of photo repeat machines).

The invention consists of the following separate assemblies:
1. Interferometer dual axes optical block: Size as small as possible, approximately 1 ½×1 ½×1 inch. This is mounted on the quill or microscope.
2. Laser and photodetector assembly, which includes alignment telescope. This package may weigh 30 pounds.
3. Mirror plate assembly: This assembly contains a support for X-axis and Y-axis mirrors.
4. In the event that the laser package cannot be placed on the same support as the optical block, then reflecting mirrors must be supplied, as in FIG. 4.

The above design should preferably incorporate provisions where the optical block can be mounted in a removable position onto the laser package. In this manner, it is possible to use the packages either independently or together.

Referring more specifically to FIG. 3, instrument 20 which may be a microscope or quill, is mounted on a fixed stationary support 21 upon which is also mounted the interferometer and detector means 22. The optical interferometer block 23 is mounted on fixed support T21 adjacent the work instrument 20. The work table comprises X-carriage 24 and Y-carriage 25 movably mounted as previously described. The Y-motion is measured by means of reflections from the Y-mirror 26 which is mounted on the Y-carriage parallel to the X-axis.

The X-movement is measured by means of reflections from the X-mirror 27 which is mounted on the Y-carriage and is parallel to the Y-axis. As the X- and Y-carriages move to locate the workpiece, which may be a film of plan that is being viewed or marked, then the X- and Y-coordinate distances are measured by the interferometer block 23 which produces fringes which are detected by the detector means 22. Details of the interferometer block are shown in FIGS. 5 and 6.

FIG. 4 shows a variation of FIG. 3. In this embodiment, the X-mirror 27' and the Y mirror 26' are stationary and the optical block 23' is mounted on the Y-carriage 25'. The heavy laser and detector means 22' is stationary and the laser beam is directed to and from the optical block 23' by means of the mirror 28 mounted on the X-carriage 24' and the mirror 29 mounted on the Y-carriage.

Figures 5, 5A:
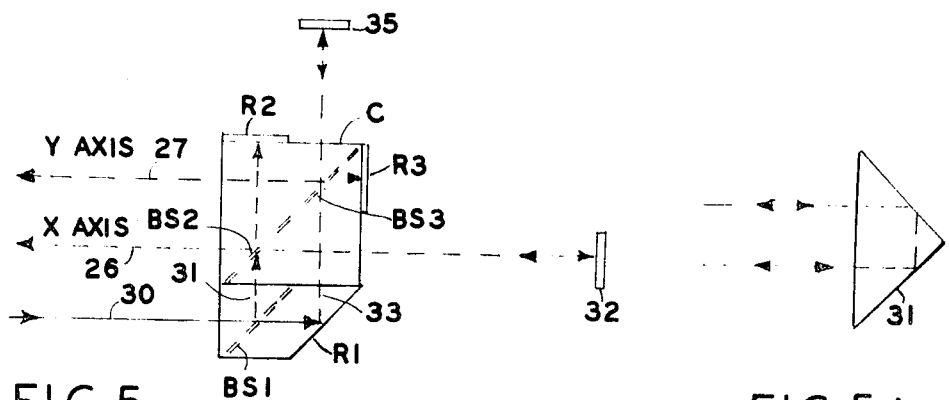
FIG. 5 is a schematic diagram of an optical block interferometer of the present.
FIG. 5A is a schematic diagram of a modification of FIG. 5.
Figure 6:
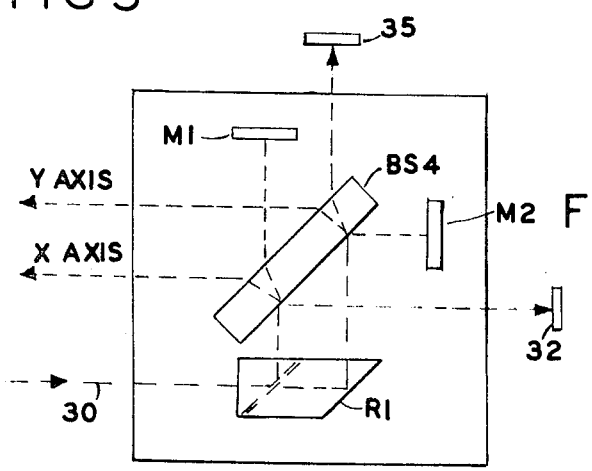
FIG. 6 is a schematic diagram of a modification of FIG. 5.

FIG. 5 illustrates the basic optical block for a dual axes interferometer. The laser input light or other coherent light beam 30 is split by the beam-splitting surface BS1 to the X- and Y-axes interferometers. The reflected portion, X interferometer illumination 31, is split by the interferometer beam-splitting surface BS2 and directed to the X-moving mirror 32 and to the fixed mirror R2. The fixed X-axis mirror R2 is manufactured by depositing a highly reflective surface on the surface C of the prism block.

The Y-axis input illumination beam 33 is reflected by R1 and is split by the interferometer beam-splitting surface BS3 to the fixed reflective surface R3. Beam 33 continues to Y-mirror 35 and is reflected back to BS3.

The illumination beams arriving at the interferometer recombines again at the beam-splitting surfaces BS2 and BS3 and produces fringes which are shown as the output "X" and "Y" beams 26 and 27. The above optical block can be manufactured from four glass pieces which are then cemented together.

Another embodiment is shown in FIG. 6. This is identical to that described above except that the beam splitter BS4 and mirrors M1 and M2 are separate pieces. All these pieces can be cemented on one glass optical block 30 to achieve stability. The disadvantage of the FIG. 6 approach is its relatively larger size, and increased possibility of shift after adjustment. This embodiment, however, has the advantage that it utilizes standard optical parts which can be manufactured. The FIG. 5 approach contains less parts, but are relatively more difficult to make.

The FIG. 5 embodiment has a built-in feature where it can be used either as a double-path or a single-path interferometer. Thus, if the output to the X- or Y-mirror is directed to a reflector such as a corner cube, then the same surfaces R2 or R3 can be used to reflect back the illumination allowing the utilization of a double-path system. The location of a corner reflector 31 is shown in FIG. tA.

Figure 7:
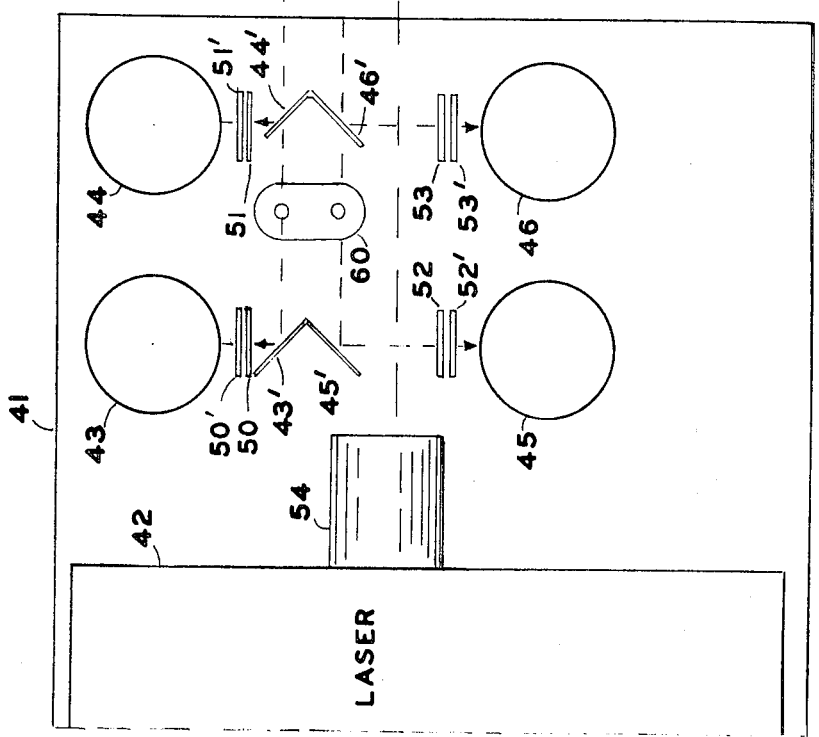
FIG. 7 is a schematic diagram of an embodiment of the present invention capable of determining direction of movement.

FIG. 7 shows a more detailed embodiment of the invention which is a two-phase system on each axis so that directional sense may be determined. The laser package 41 contains the laser 42 and four photomulitpliers 43, 44, 45, 46 and associate beam splitters 43', 44', 45', 46'. In addition, it contains polarizers 50, 51, 52, 53 and preferably red filters 50', 51', 52', 53', to pass only the laser beam. In addition, it contains a telescope 54 which reduces the diameter of the beam from one-fourth inch in diameter to 0.04 inches in diameter. The optical block has a focus lens 59.

The reason for the telescope is that the larger beam does not expand as much as a smaller beam. Thus, if the beam is large, its angle deviation is small and can thus travel large distances without expanding appreciably. Then, if the distance between the laser and optical block is large then it is necessary to utilize a large beam to minimize this deviation. The beam is reduced within the optical block to allow a maximum tolerance of angular deviation between the optical block and X- or Y-mirrors. It has been determined experimentally, and verified by tests that a one-fourth inch beam can tolerate 5 seconds or arc deviation. A 0.04 inch beam would tolerate an inversely proportional angular deviation of 30 seconds of arc.

Placed in front of the X-axis and Y-axis beams on the optical block B are circular polarizers 55 and 56. The characteristics of these plates is to retard one linear axis of polarization by approximately 90° phase so that on each axis there are two signals differing 90° in phase. Then two polarizers 50 and 51 used as analyzers are placed in front of the Y-photomultipliers 43 and 44 to allow one plane polarized light to arrive at photomulitplier 43 and an orthogonal one to photomultiplier 44. Similarly polarizers 52 and 53 are placed in front of X-photomultipliers 45 and 46 to separate the X-beam components.

The optical block has the requirements of extremely high precision to obtain orthogonality of axes. In order to meet these requirements, wedges may be cemented on one of the faces of the optical block.

The embodiment of FIGS. 8 and 9 is similar to that of FIG. 7 except that the optical block 70 is shown mounted on the Y-carriage 71 and the beams are transmitted to and from the optical block by means of the fixed mirror 72 which is mounted on the X-carriage. The fixed mirrors 73 and 74 are mounted on the base 75.

The alignment of the optical block to the laser package is achieved by placing a beam splitter 60 FIG. 9 into the path of either X- or Y-axes beam. A small portion of the light, for instance 10 percent, is reflected to an alignment telescope 61. This telescope contains a crosshair 62, on which the optical block is aligned so that the reflected light is at the crosshair of the telescope. After the optical block is aligned, then the Y-axis or X-axis large mirror may be adjusted. Their alignment is achieved through the same telescope, since the reflected image must also lie in the center of the crosshair.

I claim:

1. A dual axes interferometer for measuring movement of an instrument along coordinate axes in a machine having x- and y-coordinate axes carriages movable on a base including a light source and interference fringe detector means fixedly mounted on said base and an integral block mounted on one of said carriages, said block consisting of a first beam-splitting surface oriented at 45° to an input beam and splitting said input beam into transmitted and reflected components, a second beam-splitting surface parallel to said first beam-splitting surface receiving said reflected component and splitting it into a first pair of transmitted and reflected subcomponents, a first reference reflecting surface positioned on said block to reflect said first transmitted subcomponent back to said second beam-splitting surface and a first relatively moving reflector for returning said first reflected subcomponent along one of said carriages coordinate axes back to said second beam-splitting surface thereby producing interference fringes at said detector means indicative of movement along said one axis.

a second reflecting surface on said block parallel to said first beam-splitting surface, a third beam-splitting surface coextensive with said second beam-splitting surface receiving said transmitted component from said second reflecting surface and splitting it into a second pair of transmitted and reflected subcomponents, a second reference reflecting surface receiving said second reflected subcomponent and reflecting it back to said third beam-splitting surface and a second relatively moving reflector for returning said second transmitted subcomponent back along the other of said carriage coordinate axis to said third beam-splitting surface thereby producing interference fringes at said detector means indicative of movement along the other of said coordinate axes.

2. Apparatus as in claim 1 wherein said light source is a laser generator.

3. Apparatus as in claim 1 wherein said optical block includes means for obtaining dual phase reflections whereby the directional sense of movement may be obtained.

4. Apparatus as in claim 1 wherein said reference reflecting surfaces each have reflection means on both sides and said moving reflectors are corner cubes cooperating with said reference reflecting surfaces to provide a double-beam mode of operation.

* * * * *